(12) United States Patent
Iyoki et al.

(10) Patent No.: US 8,161,568 B2
(45) Date of Patent: Apr. 17, 2012

(54) SELF DISPLACEMENT SENSING CANTILEVER AND SCANNING PROBE MICROSCOPE

(75) Inventors: Masato Iyoki, Chiba (JP); Naoya Watanabe, Chiba (JP)

(73) Assignee: SII NanoTechnology Inc. (JP)

( * ) Notice: Subject to any disclaimer, the term of this patent is extended or adjusted under 35 U.S.C. 154(b) by 315 days.

(21) Appl. No.: 12/592,428

(22) Filed: Nov. 24, 2009

(65) Prior Publication Data
US 2010/0132075 A1 May 27, 2010

(30) Foreign Application Priority Data

Nov. 27, 2008 (JP) ................................ 2008-302429

(51) Int. Cl.
*G01B 11/00* (2006.01)
*G01B 11/14* (2006.01)
*G01B 11/02* (2006.01)

(52) U.S. Cl. ........... 850/26; 850/3; 850/5; 850/6; 850/7; 850/56; 850/21; 850/58; 73/105

(58) Field of Classification Search ................. 850/3, 5, 850/6, 7, 21, 26, 56, 58; 73/105
See application file for complete search history.

(56) References Cited

U.S. PATENT DOCUMENTS

| | | | | |
|---|---|---|---|---|
| 5,235,187 A * | 8/1993 | Arney et al. | ..................... | 850/58 |
| 5,334,835 A * | 8/1994 | Nakayama et al. | ............ | 850/56 |
| 5,449,903 A * | 9/1995 | Arney et al. | ..................... | 850/58 |
| 5,537,863 A * | 7/1996 | Fujiu et al. | ...................... | 73/105 |
| 5,574,279 A * | 11/1996 | Ikeda et al. | ..................... | 850/56 |
| 5,679,952 A * | 10/1997 | Lutwyche et al. | ............. | 850/56 |
| 5,994,698 A * | 11/1999 | Kawade et al. | ................. | 850/26 |
| 6,293,808 B1 * | 9/2001 | Ochiai | ........................... | 439/70 |
| 6,329,622 B1 * | 12/2001 | Ando | ............................ | 200/537 |
| 6,388,252 B1 * | 5/2002 | Takahashi et al. | ................ | 850/7 |
| 6,435,015 B1 * | 8/2002 | Yamamoto | ...................... | 73/105 |
| 6,530,266 B1 * | 3/2003 | Adderton et al. | .............. | 73/105 |
| 6,593,571 B1 * | 7/2003 | Yasutake | .......................... | 850/3 |
| 6,810,720 B2 * | 11/2004 | Adderton et al. | .............. | 73/105 |
| 7,017,398 B2 * | 3/2006 | Adderton et al. | .............. | 73/105 |
| 7,444,857 B2 * | 11/2008 | Hare et al. | ...................... | 73/105 |
| 7,474,410 B2 * | 1/2009 | Moon | .......................... | 356/501 |
| 7,683,319 B2 * | 3/2010 | Makino et al. | ................. | 250/310 |
| 7,787,133 B2 * | 8/2010 | Iyoki et al. | .................... | 356/614 |
| 7,945,965 B2 * | 5/2011 | Watanabe et al. | ............... | 850/33 |
| 2001/0004556 A1 * | 6/2001 | Zhou et al. | ...................... | 439/66 |
| 2001/0024892 A1 * | 9/2001 | Ochiai | .............................. | 439/67 |
| 2008/0049223 A1 * | 2/2008 | Iyoki et al. | .................... | 356/369 |
| 2008/0049236 A1 * | 2/2008 | Iyoki et al. | .................... | 356/614 |
| 2009/0235396 A1 * | 9/2009 | Wang et al. | ....................... | 850/6 |
| 2009/0261249 A1 * | 10/2009 | Kobayashi et al. | ........... | 250/306 |
| 2009/0265819 A1 * | 10/2009 | Watanabe et al. | ............... | 850/21 |
| 2010/0058499 A1 * | 3/2010 | Shigeno | .......................... | 850/21 |
| 2010/0064395 A1 * | 3/2010 | Clark | .............................. | 850/26 |
| 2010/0107284 A1 * | 4/2010 | Shigeno et al. | ................... | 850/5 |
| 2010/0132075 A1 * | 5/2010 | Iyoki et al. | ......................... | 850/6 |

(Continued)

*Primary Examiner* — David A Vanore
(74) *Attorney, Agent, or Firm* — Adams & Wilks

(57) ABSTRACT

A cantilever has a probe portion and a cantilever portion having a free end portion from which the probe portion extends. A displacement detecting portion detects a displacement of the cantilever portion according to an interaction between a sample and the probe portion. An electrode portion is connected to the displacement detecting portion. An insulation film is formed over at least one of the electrode portion and the displacement detecting portion. A functional coating in the form one of a conductive film, a magnetic film, and a film having a light intensity amplifying effect is disposed on the insulation film.

20 Claims, 10 Drawing Sheets

U.S. PATENT DOCUMENTS

2010/0154085 A1* 6/2010 Maruyama et al. ............. 850/32
2010/0321132 A1* 12/2010 Park .............................. 333/186
2011/0030109 A1* 2/2011 Saito ................................ 850/5
2011/0277193 A1* 11/2011 Smetana et al. ................ 850/56

* cited by examiner

SELF DISPLACEMENT SENSING CANTILEVER AND SCANNING PROBE MICROSCOPE

BACKGROUND OF THE INVENTION

1. Field of the Invention

The present invention relates to a self displacement sensing cantilever for a scanning probe microscope for measuring a surface shape or analyzing physical properties of a surface of a sample by bringing a cantilever having a probe at its tip close to or into contact with the sample. The present invention also relates to a scanning probe microscope having the self displacement sensing cantilever.

2. Description of the Related Art

There is known a scanning probe microscope as an apparatus for measuring a very small region of a sample such as a metal, a semiconductor, a ceramic, a resin, a high polymer, a biomaterial, an insulator, or the like, so as to measure a shape or physical property information such as electric, magnetic, optical, or mechanical characteristic, and the like of a surface of the sample.

In such scanning probe microscope, a cantilever having a probe at its tip is brought close to or into contact with the sample surface, and the sample is relatively scanned by the probe with a triaxial micromotion mechanism in a sample plane (XY direction). During this scanning action, a displacement amount of the cantilever is measured by a displacement detection mechanism while the sample or the probe is moved in the direction (Z direction) perpendicular to the sample surface for controlling a distance between the sample and the probe, and hence the surface shape and various types of physical property information are measured.

Here, as a usual displacement detection mechanism of the cantilever, a laser is projected to a back surface of the cantilever, and reflection light from the cantilever is detected by a photodetector so that a displacement amount is detected from a spot position on the photodetector. This displacement detection mechanism is called an "optical leverage system". However, the displacement detection mechanism according to the optical leverage system requires adjustment of optical axis for projecting the laser beam to the back surface of the cantilever and receiving the reflection light from the cantilever in a detection surface of the photodetector before the measurement, and the adjustment work takes long time and much effort. In addition, when the scanning probe microscope is used, an optical microscope is usually disposed above or below the sample, and hence the sample and the probe are observed simultaneously by the optical microscope for positioning of a part of the sample to be measured with the probe tip based on an image on the optical microscope. However, the displacement detection mechanism of the optical leverage system is interposed between an objective lens of the optical microscope and the sample or the cantilever, and hence the working distance is short and an objective lens having a large numerical aperture may not be used. As a result, high resolution observation may not be performed with the optical microscope.

In addition, also in a case of a scanning near-field microscope for measuring optical characteristics of the sample surface with a scanning probe microscope, an objective lens is used for a purpose of condensing light from a light source so as to excite an evanescent field on the sample surface or condensing light generated by interaction between the probe tip and the sample. However, there is the case where an objective lens having a large numerical aperture may not be used because of the interposition of the displacement detection mechanism, which causes deterioration of the exciting efficiency or the condensing efficiency, or light of the optical leverage is mixed with detection light for the optical characteristic, which causes an increase of noise or a lowered resolution and hence disturbs accurate measurement.

In order to solve the above-mentioned problem due to the optical leverage system, a self displacement sensing cantilever is available for actual use in which the cantilever itself is equipped with a displacement detecting portion for detecting a displacement of the cantilever.

Here, with reference to Japanese Patent Application Laid-open No. 05-248810, a structure of a conventional self displacement sensing cantilever is described.

As illustrated in FIGS. 9A to 9C, the conventional self displacement sensing cantilever has a cantilever portion 112 constituted of two beams 112a and 112b protruding from a proximal end portion 116. The two beams 112a and 112b are combined at the tip to make a triangular free end, which is provided with a probe 114 having a sharp-pointed tip. The cantilever portion 112 is constituted of a lamination of a silicon layer 120, a piezoresistance layer 122, and an insulation layer 124. Among the layers, the piezoresistance layer functions as a displacement detecting portion and is formed by implanting boron into the surface of the silicon layer constituting the cantilever portion. In addition, the insulation layer is formed by depositing silicon oxide. Further, the proximal end portion of the cantilever portion 112 is provided with electrodes 118 that are electrically connected to the piezoresistance layer 122 via contact holes 126.

The self displacement sensing cantilever having such structure is connected to a displacement measurement circuit disposed externally via the electrodes 118. The displacement measurement circuit includes a voltage applying circuit and a current detecting circuit, so as to apply a predetermined DC voltage to the piezoresistance layer. Current flowing in this case is always measured by the current detecting circuit inside the displacement measurement circuit 140. If a displacement occurs in the cantilever portion, the displacement causes a change of specific resistance of the piezoresistance layer 122 so that current flowing in the piezoresistance layer 122 changes. Therefore, the displacement of the cantilever portion 112 may be measured by detecting the change of current value by the current detecting circuit inside the displacement measurement circuit.

It is noted that there is a type of the self displacement sensing cantilever having no insulation layer.

However, the conventional self displacement sensing cantilever has a problem as described below.

Because the cantilever portion is made of a semiconductor, photocurrent is generated when the cantilever portion is irradiated with light. Therefore, current having no relationship with a displacement of the cantilever portion may flow in the current detecting circuit, and hence a malfunction may occur in the displacement detecting circuit due to optical noise, or a noise component in the measurement data may increase.

Therefore, it is impossible to perform the measurement with the scanning probe microscope at the same time as projecting light to the cantilever, and it is necessary to perform the projection of light and the measurement with the scanning probe microscope alternately.

Therefore, observation with the optical microscope may not be performed in the state where the sample is close to the probe, and hence accuracy of positioning of the part to be measured by the image of the optical microscope is deteriorated.

In addition, in the case of the scanning near-field microscope that requires to project exciting light in the state where the probe and the sample are close to each other, the exciting light causes optical noise to render distance control impossible.

In addition, if the scanning probe microscope is used for measuring electric characteristics or magnetic characteristics, or measuring optical characteristics by dispersing the near field generated on the sample surface by the probe tip, it is necessary to form a functional coating for enhancing conductivity, magnetic property, or light amplifying effect on the cantilever portion including the probe tip. Such functional coating usually has conductivity of metal or the like. Therefore, if the coating is formed directly on the displacement detecting portion or the electrode portion of the cantilever, the electrode portion or the piezoresistance member may be short-circuited so that the displacement detecting portion does not work. Therefore, it is necessary to form the functional coating while protecting the electrode portion or the piezoresistance member portion, which takes a long manufacturing time period and much cost due to complicated film forming steps.

SUMMARY OF THE INVENTION

The present invention has been made to solve the above-mentioned problems, and it is an object of the present invention to provide a self displacement sensing cantilever that is capable of measuring with a scanning probe microscope while being projected with light, and is capable of being formed with a functional film easily even if a cantilever is provided with a displacement detecting portion and an electrode portion communicated with the displacement detecting portion. It is also an object of the present invention to provide a scanning probe microscope that uses the self displacement sensing cantilever for measuring physical properties such as optical, electric, or magnetic properties easily with high accuracy.

In order to achieve the above-mentioned object, the present invention provides a self displacement sensing cantilever, including: a cantilever that has a probe at its tip and has a distal end portion at its distal end; a displacement detecting portion that is provided to the cantilever, for detecting a displacement of the cantilever; an electrode portion that is connected to the displacement detecting portion and is communicated with the distal end portion; and an insulation film that is formed over at least one of the electrode portion and the displacement detecting portion of the cantilever, in which the insulation film is applied with a coating of an arbitrary material. The coating on the insulation film is preferably a metal film, and the insulation film is preferably made of one of silicon nitride and silicon oxide.

The coating on the insulation film of the self displacement sensing cantilever has the above-mentioned structure functions as a light shield film. Alternatively, the insulation film itself may be a light shield film.

With the structure described above, the displacement detecting portion may detect a displacement without being affected by a malfunction or noise due to light.

Further, according to the present invention, the coating on the insulation film of the self displacement sensing cantilever is applied continuously to the probe provided on the tip. The coating on the insulation film is such a functional coating as a conductive film, a magnetic film, or a film having a light intensity amplifying effect.

With the structure of the self displacement sensing cantilever described above, the functional coating may be formed for measuring electric, magnetic, optical, or other physical properties easily with high accuracy even if the cantilever is provided with the displacement detecting portion or the electrode portion communicated with the displacement detecting portion.

Further, according to the present invention, there is provided an optical microscope combined type scanning probe microscope, including: an optical microscope including an illumination device; and the self displacement sensing cantilever including a light shield film that is disposed above an optical path of the optical microscope, in which the self displacement sensing cantilever is used to perform measurement with the optical microscope combined type scanning probe microscope while projecting illumination light from the illumination device to a sample.

With this structure, the observation with the scanning probe microscope may be performed at the same time as performing observation with the optical microscope with high resolution.

Further, the self displacement sensing cantilever according to the present invention is used for a scanning probe microscope including a light source for projecting light to at least one of a sample and a probe, and measurement with the scanning probe microscope is performed by using the self displacement sensing cantilever while projecting light to the at least one of the sample and the probe from the light source. Further, the light source forms an evanescent field in a vicinity of a probe tip of the self displacement sensing cantilever. Further, the probe tip scatters the evanescent field to measure optical characteristics of a sample surface. Further, the probe tip of the self displacement sensing cantilever has an opening part formed therein, the probe is coated with the light shield film except for the opening part, and one of by generating the evanescent field in a vicinity of the opening part to be projected to a sample surface, and by condensing the evanescent light by the opening part, optical characteristics of a sample surface are measured.

With the structure of the scanning probe microscope described above, the measurement with the scanning near-field microscope may be performed in the state in which the self displacement sensing cantilever is irradiated with light. In this case, an objective lens or the like for detecting an optical signal may be brought close to the probe, and hence the exciting efficiency or the condensing efficiency may be improved. In addition, the operability is also improved.

Further, according to the present invention, measurement with the scanning probe microscope is performed in a state in which at least a part of the self displacement sensing cantilever is one of partly and entirely immersed in a solution. The self displacement sensing cantilever is covered with the insulation film, and hence the measurement may be performed without leak current or the like even in the solution.

Further, according to the present invention, measurement with the scanning probe microscope is performed by using an immersion lens, filling between the immersion lens and a sample with solution, and immersing the self displacement sensing cantilever one of partly and entirely in the solution. With this structure, an objective lens having a high numerical aperture may be used for the measurement so that the resolution in the observation with the optical microscope is improved. In addition, when a spectral operation is performed or when the scanning probe microscope is used as a scanning near-field microscope, the above-mentioned immersion lens may be used so that the exciting efficiency or the condensing efficiency is improved and a signal to noise ratio may be improved.

According to the present invention, the measurement with the scanning probe microscope may be performed at the same time as projecting light. Therefore, the resolution of the optical microscope that is combined with the scanning probe microscope may be improved, the exciting efficiency or the condensing efficiency in the optical characteristic measurement may be improved, and accuracy of positioning or operability may also be improved. In addition, even when the displacement detecting portion and the electrode portion communicated with the displacement detecting portion are provided to the cantilever, the functional film may be formed easily without losing the function of the displacement detecting portion. As a result, physical properties such as optical, electric, or magnetic properties may be easily measured with high accuracy.

DETAILED DESCRIPTION OF THE PREFERRED EMBODIMENTS

Hereinafter, embodiments of the present invention are described with reference to the attached drawings.

First Embodiment

Figure 1A:
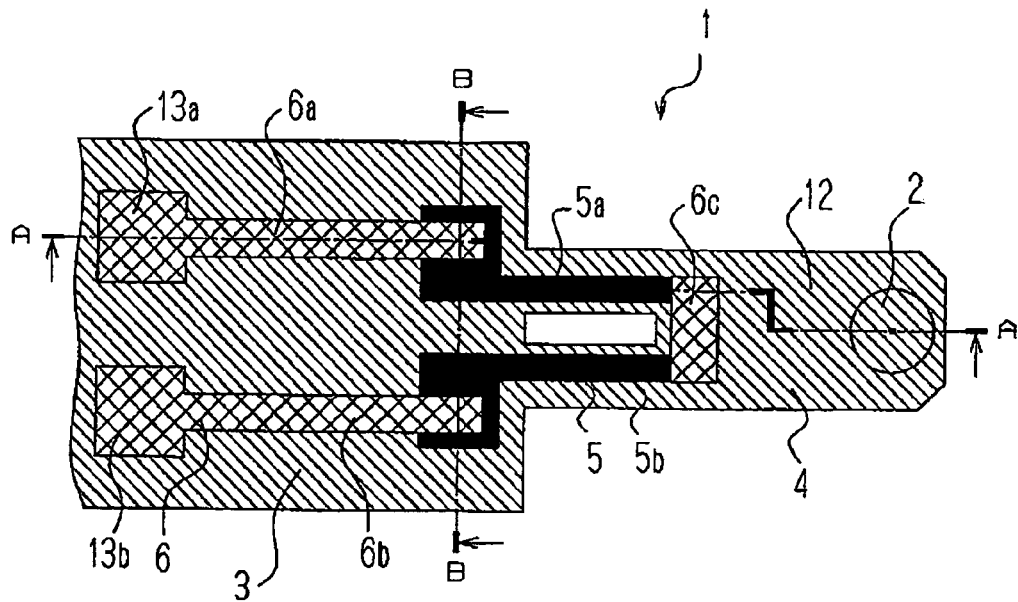
FIG. 1A is a plan view of a self displacement sensing cantilever according to a first embodiment of the present invention.
Figure 1B:
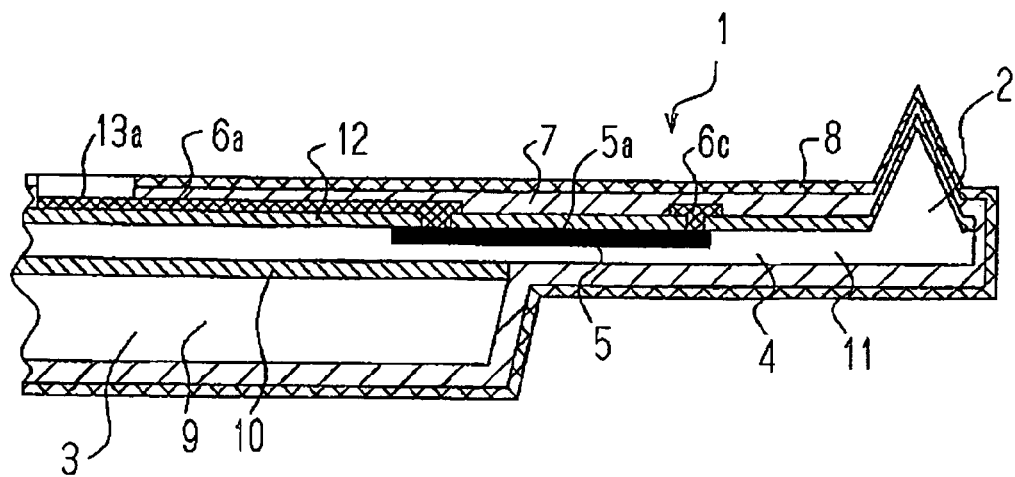
FIG. 1B is a cross sectional view cut along the line A-A of FIG. 1A.
Figure 1C:
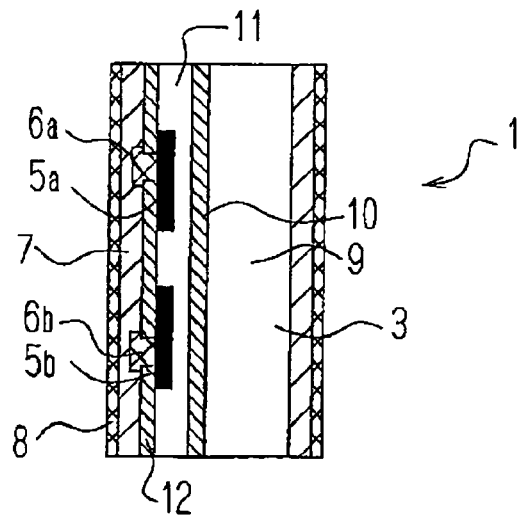
FIG. 1C is a cross sectional view cut along the line B-B of FIG. 1A.

FIGS. 1A to 1C illustrate a general appearance view of a self displacement sensing cantilever 1 according to a first embodiment of the present invention. FIG. 1A is a plan view of a surface on which a probe is disposed, which illustrates the state before forming an insulation film 7 made of silicon nitride and a metal film 8 made of aluminum that are described later. In addition, FIGS. 1B and 1C illustrate cross sections respectively cut along the line A-A and the line B-B of FIG. 1A, and illustrate the state where the insulation film 7 and the metal film 8 are formed.

The self displacement sensing cantilever 1 illustrated in FIGS. 1A to 1C includes a cantilever or cantilever portion 4 having a probe 2 at its tip and a proximal end portion 3 at its proximal end, a displacement detecting portion 5 for detecting a displacement of the cantilever 4, and an electrode portion 6 that is connected to the displacement detecting portion 5 and is communicated with the proximal end portion 3. In addition, the insulation film 7 is formed in the region, on the surface on which the probe 2 is disposed, extending from the cantilever 4 to the proximal end portion 3 and including the electrode portion 6 and the displacement detecting portion 5, and further the metal film 8 is formed so as to coat the insulation film 7.

The proximal end portion 3 has a lamination structure including a silicon layer 9 and a silicon oxide layer 10 formed on the silicon layer 9. An n-type silicon substrate 11 is formed on top of the silicon oxide layer 10 from the proximal end portion 3 to the tip of the cantilever 4 continuously, and this n-type silicon substrate 11 is a main material constituting the cantilever 4.

Two linear p-type impurity silicon portions 5a and 5b are formed by injection in parallel to the longitudinal direction of the cantilever 4 on the surface of the n-type silicon substrate 11 from the distal end of the cantilever 4 to a part of the proximal end portion 3. The p-type impurity silicon portions 5a and 5b function as the piezoresistance member and constitute the displacement detecting portion 5 of the cantilever.

A silicon oxide film 12 for insulation that prevents leak current among electrodes 6a, 6b, and 6c, the n-type silicon substrate 11, and the p-type silicon substrates 5a and 5b is formed on surfaces of the n-type silicon substrate 11 and the p-type impurity silicon portions 5a and 5b, and an aluminum film is formed on a part of the surface of the silicon oxide film 12 so as to form the electrodes 6a, 6b, and 6c.

The electrode portion 6 is formed by removing a part of the silicon oxide film 12 so as to electrically connect the tip portions of the two linear p-type impurity silicon portions 5a and 5b on the cantilever via the electrode 6c so that the displacement detecting portion 5 is formed in a U-shape, and the electrodes 6a and 6b are respectively communicated with the two end portions of the U-shape disposed at the proximal end portion 3.

The electrode portions 6a and 6b are communicated with metal contact portions 13a and 13b disposed at the proximal end portion 3, and the metal contact portions 13a and 13b are connected electrically to an external electric circuit.

The conventional self displacement sensing cantilever includes the electrodes 6a, 6b, and 6c and the insulation portion 12 made of silicon oxide which are formed on the topmost surface as described above, but in this embodiment, in addition, except for the metal contact portions 13a and 13b, the insulation film 7 made of silicon nitride is formed so as to coat the entire surface of the surface on which the probe 2 of the cantilever portion 4 is disposed and the opposite surface and also to the tip of the probe 2. Further in this embodiment, the metal coating 8 of aluminum is formed on the surface of the silicon nitride film 7 by sputtering.

With the above-mentioned structure, the electrode portions 6a, 6b, and 6c are insulated by the silicon nitride film 7, and hence the metal coating 8 of aluminum may be formed without a short circuit.

Figure 2:
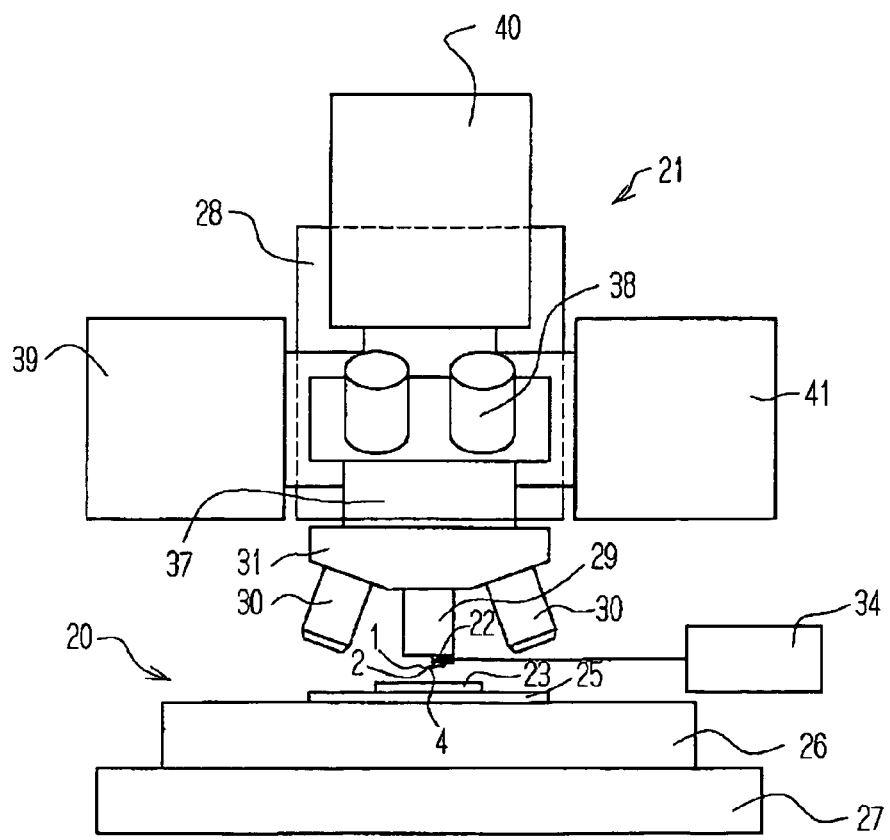
FIG. 2 is a general appearance view of a scanning probe microscope according to the first embodiment of the present invention.
Figure 3:
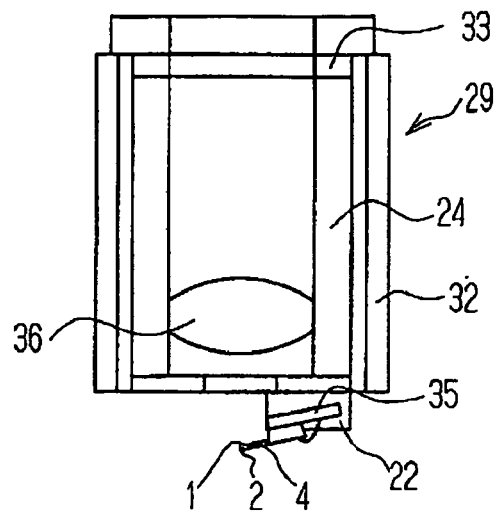
FIG. 3 is a cross sectional view of a scanning probe microscope module that is used for the scanning probe microscope illustrated in FIG. 2.

Next, an application example of the self displacement sensing cantilever 1 of this embodiment to a scanning probe microscope is described with reference to FIGS. 2 and 3. FIG. 2 is a general appearance view of an upright optical microscope combined type scanning probe microscope in which the self displacement sensing cantilever 1 of FIGS. 1A to 1C is used. FIG. 3 is a cross sectional view of a scanning probe microscope module 29 that is used for the scanning probe microscope illustrated in FIG. 2.

In this apparatus, a scanning probe microscope portion 20 and an optical microscope portion 21 constitute a unit.

The scanning probe microscope portion 20 includes a cantilever holder 22 for holding the self displacement sensing cantilever 1, a Z-axis micromotion mechanism 24 for moving the cantilever 1 in the direction perpendicular to the sample surface in order to control a distance between the sample 23 and the probe 2 with the cantilever holder 22 being fixed thereto, a sample holder 25 on which the sample 23 is placed, which is disposed at the position being opposed to the tip of the probe 2 of the self displacement sensing cantilever 1, an XY micromotion mechanism 26 for moving the sample 23 in the sample in-plane direction with the sample holder 25 being fixed thereto, an XY stage 27 disposed below the XY micromotion mechanism 26 for performing positioning in the sample plane more roughly and in a wider area than the XY micromotion mechanism 26, and a Z stage 28 for rough movement that is used for making the sample 23 be close to the probe 2 of the self displacement sensing cantilever 1.

In the scanning probe microscope portion 20, the cantilever holder 22 and the Z-axis micromotion mechanism 24 are constituted as the scanning probe microscope module 29 illustrated in FIG. 3, which is fixed to a revolver 31 for fixing an objective lens 30 of the optical microscope portion 21 that is described later. In the scanning probe microscope module 29, the Z-axis micromotion mechanism 24 including a cylindrical piezoelectric element is fixed via an insulation washer 33 inside the cylindrical barrel 32, and the cantilever holder 22 is fixed to the tip portion thereof. The cantilever holder 22 is provided with an electrical contact that contacts with the metal contact portions 13a and 13b of the proximal end portion 3 of the self displacement sensing cantilever 1, and the electrical contact is connected via a preamplifier portion 34 to a control portion (not shown). In addition, the cantilever holder 22 incorporates a piezoelectric element 35 for vibration. A contact type atomic force microscope measuring function is available, in which a displacement when the probe 2 and the sample 23 are brought close to each other without vibrating the cantilever 4 is detected for controlling a distance between the probe 2 and the sample 23. In addition, a vibration type atomic force microscope function is also available, in which the cantilever 4 is vibrated by the piezoelectric element 35 at the resonance frequency or its vicinity while the probe 2 and the sample 23 are brought close to each other for controlling a distance based on the amplitude, the phase or a change of the resonance frequency.

Inside the hollow cylindrical piezoelectric element 24, a lens 36 is fixed so that the cantilever 4 and the sample 23 may be observed by the optical microscope 21. Note that if the self displacement sensing cantilever 1 is attached to the cantilever holder 22, the tip of the probe 2 is positioned on the optical axis of the lens 36.

The XY micromotion mechanism 26 has a flat type stage in which a parallel spring mechanism is driven by a lamination type piezoelectric element. This XY micromotion mechanism 26 is placed on the XY stage 27.

Each of the XY stage 27 and the Z stage 28 uses a stepping motor and a feed screw that constitute an electric stage. An optical microscope 21 is attached to the Z stage 28, and the entire optical microscope 21 is moved, to thereby bring the scanning probe microscope module 29 attached to the revolver 31 of the optical microscope 21 close to the sample 23.

On the other hand, the optical microscope portion 21 includes the objective lens 30, the revolver 31 to which the objective lens 30 and the scanning probe microscope module 29 are attached, a microscope barrel portion 37, an ocular lens portion 38, a support pillar portion (not shown) to which the optical microscope portion 21 is attached, and the Z stage 28 attached to the support pillar portion for moving the optical microscope portion 21 so as to perform focusing on the sample 23. Among the above-mentioned components, the Z stage 28 also works as the Z stage 28 for rough movement of the scanning probe microscope 20 described above.

Further, a halogen light 39, a laser microscope unit 40, and a spectroscope 41 are attached to the barrel 37 of the optical microscope portion 21, and the individual ports may be switched and used in accordance with a purpose of measurement. Note that the laser microscope 40 may also be used as a confocal microscope by forming a pinhole in the optical system.

Next, a measurement method of this embodiment is described. In this embodiment, a focal point of the objective lens 30 of the optical microscope 21 is first adjusted on the surface of the sample 23 placed on the sample stage 25 so that the sample surface may be observed. In this case, the halogen light 39 may illuminate the sample 23 for observation, or the confocal microscope 40 may project a laser beam to the sample 23 for observation with higher resolution or contrast. When the optical microscope 21 is used for the observation, the focal point of the objective lens 30 is adjusted on the surface of the sample 23 by the Z stage 28, and a part of the sample 23 to be measured is adjusted to the focal point of the objective lens 30 by the XY stage 27 on the sample 23 side.

Next, the revolver 31 is rotated so that the objective lens 30 is switched to the scanning probe microscope module 29. Note that the lens 36 of the scanning probe microscope module 29 also enables observation of the sample 23, and hence it is possible to use the scanning probe microscope module 29 for observing the optical microscope 21 from the beginning. The scanning probe microscope module 29 and the objective lens 30 are adjusted to have substantially the same position of the optical axis center and the same focal length thereof in advance, and hence the position to be measured and the focal point are hardly changed even when the objective lens 30 and the scanning probe microscope module 29 are switched therebetween.

After switching to the scanning probe microscope module 29, the position to be observed with high resolution with the scanning probe microscope 20 is determined from the image obtained by the optical microscope 21, and then the tip of the probe 2 is adjusted to the position to be measured roughly with the XY stage 27.

Next, the sample 23 and the probe 2 are brought close to each other by the Z stage 28 to be a distance that enables the measurement with the scanning probe microscope 20. Then, the Z-axis micromotion mechanism 24 controls a distance between the probe 2 and the sample 23. Here, with the distance being controlled by the Z-axis micromotion mechanism 24, the position to be measured is specified again while confirming the image of the optical microscope 21. Further, the probe 2 is adjusted accurately to the position to be measured by the XY micromotion mechanism 26. After that, raster scan of the sample 23 is performed by the XY micromotion mechanism 26, to thereby measure the image of the scanning probe microscope 20.

When the probe 2 and the sample 23 are brought close to each other, an atomic force or a contact force acting therebetween, or an intermittent contact force or the like if the cantilever 4 is vibrated, causes a change of a displacement or amplitude of the cantilever 4, and hence a distortion amount of the cantilever 4 changes.

The p-type silicon portions 5a and 5b of the displacement detecting portion 5 are incorporated in a bridge circuit disposed in the preamplifier 34, and a bias voltage is applied to the bridge circuit. In this case, if a distortion occurs in the cantilever 4, resistance values of the p-type silicon portions 5a and 5b change. Therefore, by detecting the change of the resistance values with the bridge circuit, the change of the displacement or the amplitude of the cantilever 4 may be detected.

In this case, the silicon oxide film 12 formed on the n-type silicon substrate 11 and the p-type silicon portions 5a and 5b is transparent with respect to the wavelength of the optical microscope 21 in the conventional self displacement sensing cantilever. Therefore, if the measurement with the scanning probe microscope 21 is performed while the halogen light 39 or a laser light 40 of the optical microscope 21 illuminates, the p-type silicon portions 5a and 5b used for the displacement detecting portion 5 responds to the illumination to cause optical noise. As a result, the distortion amount generated in the cantilever 4 may not be detected accurately. In order to perform the distance control between the probe 2 and the sample 23 with the Z-axis micromotion mechanism 24 based on the signal of the displacement detecting portion 5 in the conventional apparatus, it is necessary to turn off the illumination of the optical microscope 21. Therefore, it is impossible to perform the measurement with the optical microscope 21 and the measurement with the scanning probe microscope 20 simultaneously. For this reason, when the probe 2 is to be adjusted to the position to be measured, it is necessary to save the probe 2 from the sample 23 by the Z stage 28 for preventing the probe 2 from being broken, to perform the positioning while observing the probe 2 and the sample 23 in the image of the optical microscope 21, and then to bring the probe 2 again close to the area to be measured with the scanning probe microscope 20 by the Z stage 28 in the state where the illumination of the optical microscope 21 is turned off. If the Z stage 28 is moved, a mispositioning occurs in the sample in-plane direction in accordance with the accuracy of straightness of the Z stage 28. In addition, if an objective lens having high magnification is used, it is impossible to observe the probe 2 and the sample 23 at the same time with focus on both the two targets in the state where the probe 2 and the sample 23 are apart from each other because of a narrow depth of focus. Particularly in the observation with the confocal microscope 40, because of a narrower depth of focus, it is necessary to perform the observation with focus on the surface of the sample 23 and the observation with focus on the probe 2 separately in the state where the probe 2 and the sample 23 are apart from each other. Therefore, even if the position to be measured is adjusted based on the image of the optical microscope 21, the position may be deviated when the probe 2 and the sample 23 are brought close to each other again.

However, in the self displacement sensing cantilever 1 of this embodiment, the metal film 8 made of aluminum is formed on the surface of the cantilever 4 via the insulation film 7, and hence the illumination of the optical microscope 21 is cut off by the aluminum 8. Therefore, the observation with the optical microscope 21 and the observation with the scanning probe microscope 20 may be performed at the same time while illumination is provided. Thus, the positioning may be performed by the XY micromotion mechanism 26 based on the image of the optical microscope in the state where the probe 2 and the sample 23 are close to each other.

Note that the remaining port of the optical microscope 21 is provided with the spectroscope 41. The spectroscope 41 is used for analyzing physical properties of a foreign matter or the sample by Raman spectral analysis. If foreign matter analysis is performed, after performing measurement with the scanning probe microscope 20, a fine foreign matter on the sample 23 is specified from a shape image by the scanning probe microscope 20. Then, the foreign matter is moved to the optical axis center by the XY micromotion mechanism 26, and the exciting light is projected from the light source of the laser microscope 40 to the sample 23. Thus, the reflection light is led to the spectroscope 41, and then Raman scattering spectrum is measured for the foreign matter analysis. In this way, the self displacement sensing cantilever 1 of this embodiment may be used also in the spectral analysis, and hence the exciting light is cut off and does not directly irradiate the displacement detecting portion 5. As a result, optical noise does not occur, and the spectral analysis may be performed at the same time as operating the scanning probe microscope 20. Therefore, the spectral analysis may be performed in the state where the probe 2 and the sample 23 are close to each other.

Note that the self displacement sensing cantilever 1 of FIGS. 1A to 1C has the structure in which the tip of the probe 2 is hidden behind the cantilever 4 when being viewed from the rear side, but it is possible to adopt the structure in which the tip of the probe 2 protrudes from the tip of the cantilever 4 toward the free end side of the cantilever 4 so that the tip of the probe 2 may be observed from the rear side of the cantilever 4 with the optical microscope 21. If such a structure as described above is adopted, the tip of the probe 2 may be observed by the optical microscope 21, and hence the tip of the probe 2 may be adjusted easily and accurately to the position to be measured based on the image of the optical microscope 21. In addition, if the foreign matter analysis is performed by projecting the laser beam, the cantilever 4 does not become an obstacle in the optical path, and hence the exciting efficiency and the condensing efficiency of the scattering light may be improved. Thus, a signal to noise ratio in the spectral analysis may be improved.

Note that the silicon oxide layer 12 formed on the n-type silicon substrate 11 and the p-type silicon portions 5a and 5b is preferably formed at least below the electrodes 6a, 6b, and 6c so as to prevent the leak current, but this is not necessarily an essential structure. It is possible to form the silicon oxide layer 12 only below the electrodes 6a, 6b, and 6c without forming in other portions so as to form the silicon nitride layer 7 directly.

Second Embodiment

Figure 4A:
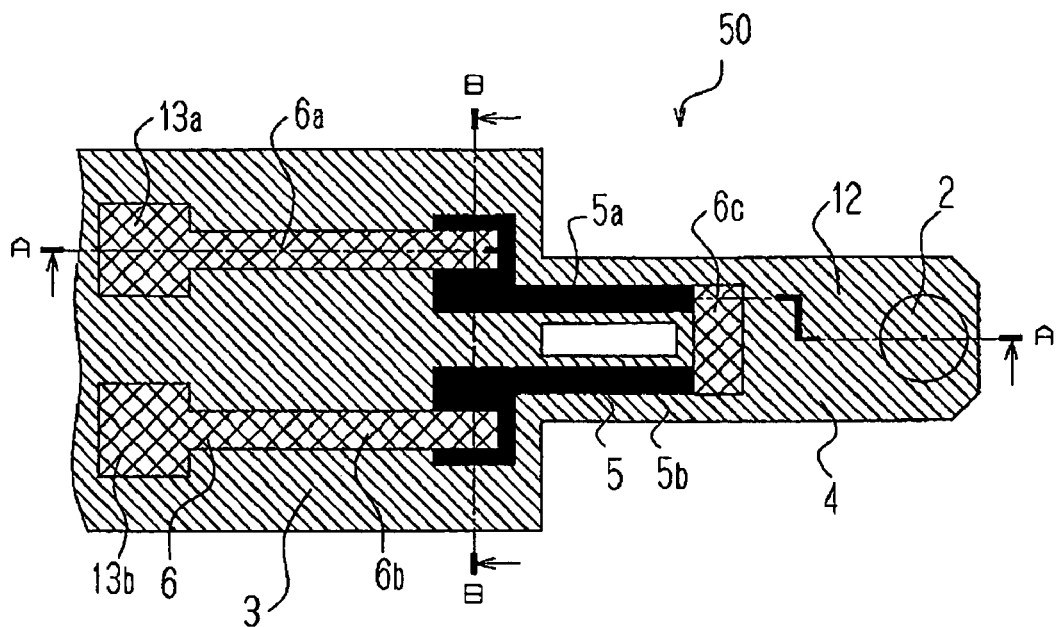
FIG. 4A is a plan view of a self displacement sensing cantilever according to a second embodiment of the present invention.
Figure 4B:
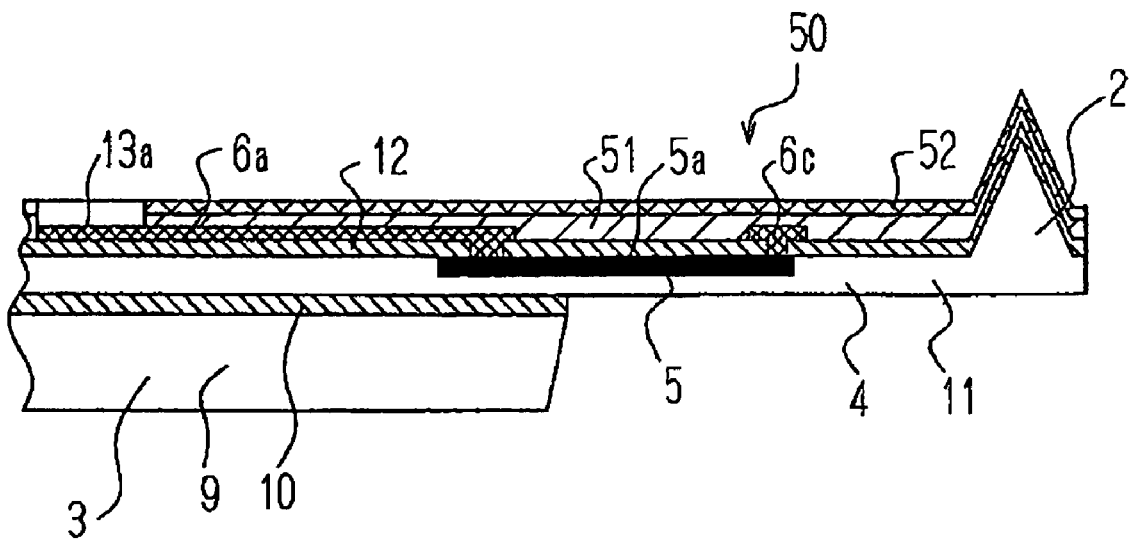
FIG. 4B is a cross sectional view cut along the line A-A of FIG. 4A.
Figure 4C:
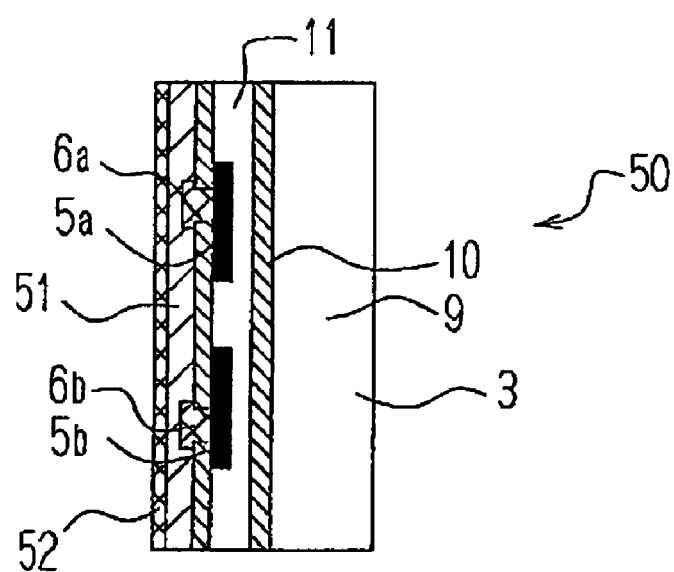
FIG. 4C is a cross sectional view cut along the line B-B of FIG. 4A.

FIGS. 4A to 4C illustrate a self displacement sensing cantilever 50 according to a second embodiment of the present invention. FIG. 4A is a plan view of a surface on which a probe 2 is disposed, which illustrates the state before forming an insulation film 51 made of silicon nitride and a metal film 52 made of silver that are described later. In addition, FIGS. 4B and 4C illustrate cross sections respectively cut along the line A-A and the line B-B of FIG. 4A, and illustrate the state where the insulation film 51 and the metal film 52 are formed.

The self displacement sensing cantilever 50 of this embodiment has the same structure as that of the self displacement sensing cantilever 1 illustrated in FIG. 1 except for the metal film 8 formed on the surface of the self displacement sensing cantilever 1 and the silicon nitride film 7 formed under the metal film 8, and hence the same part is denoted by the same reference symbol, and overlapping description in detail is omitted.

In this embodiment, the silicon nitride layer 51 and the metal layer 52 are formed only on the surface on which the probe 2 is formed, and the silicon nitride layer 51 and the metal layer 52 are not formed on the rear side with respect to the probe 2. With this structure, a film forming step on the rear side may be eliminated, with the result that manufacturing time may be shortened and cost is also decreased.

In addition, the metal film 52 is formed on the surface of the cantilever by vapor deposition of silver in this embodiment.

Figure 5:
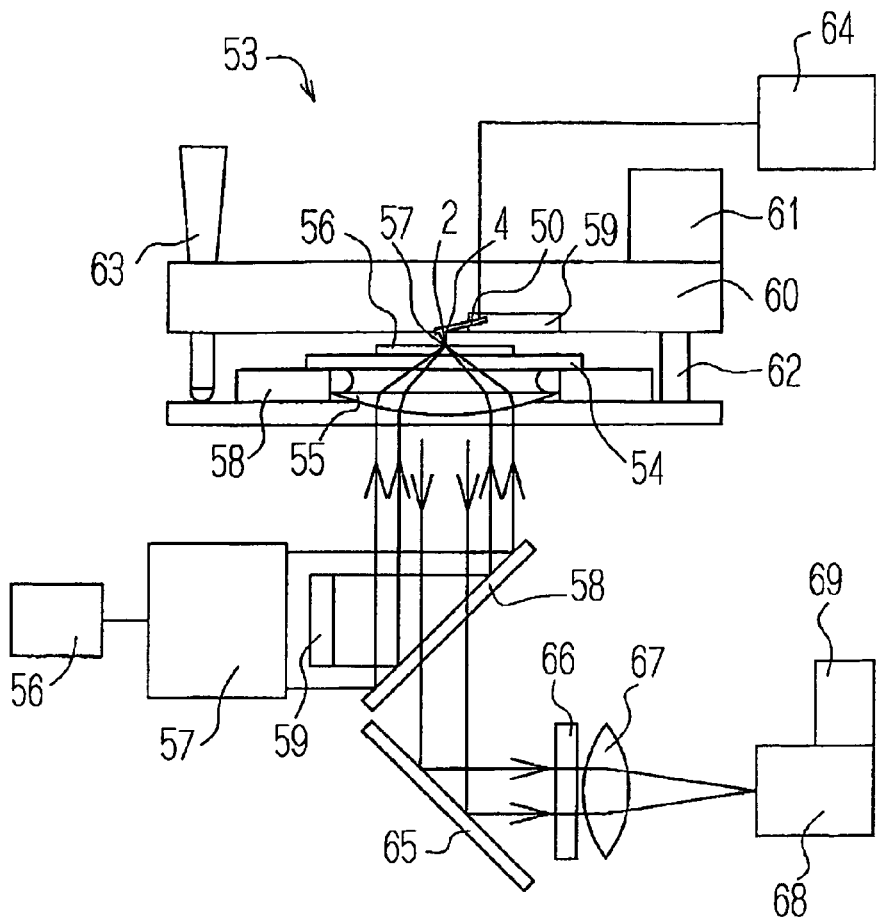
FIG. 5 is a general appearance view of a scattering near-field Raman microscope according to the second embodiment of the present invention.

Next, FIG. 5 illustrates a general appearance view of a scattering near-field Raman microscope 53 for performing local Raman spectral with a high resolution by near-field light using the cantilever 50 illustrated in FIG. 4. The near-field Raman microscope is one type of the scanning probe microscope, and this embodiment has the structure in which an inverted microscope and the scanning probe microscope are combined.

In this embodiment, an objective lens 55 having a numerical aperture of 1 or larger (here, an oil-immersion lens having a numerical aperture of 1.4) is disposed under the transparent sample holder 54. The light from a laser 56 is led to the objective lens 55. The laser beam having any wavelength in accordance with the sample may be used, but usually the laser beam having a wavelength of approximately 300 to 900 nm is used. The laser beam is converted into a parallel light beam by a beam expander 57 and is bent by 90 degrees by a half mirror 58 to be led to the objective lens 55. In this case, a disk-like light shield plate 59 is inserted in the optical path between the beam expander 57 and the half mirror 58 so as to cut off light with a numerical aperture of 1 or smaller out of the light entering the objective lens 55. With this optical system, a part of light with a numerical aperture of 1 or larger from the objective lens 55 enters the permeable sample 56, and hence the light enters the surface of the sample 56 with a total reflection angle, and an evanescent light spot 57 is formed.

The sample 56 is placed on the sample holder 54, and the sample holder 54 is provided with a triaxial micromotion mechanism 58 that is capable of a servo operation in the scanning direction in the two-dimensional plane and in the height direction by driving the parallel spring mechanism with the lamination type piezoelectric element.

On the other hand, a cantilever holder 59 is disposed above the sample 56, and the self displacement sensing cantilever 50 illustrated in FIG. 4 is attached to the cantilever holder 59.

The cantilever holder 59 is mounted on a Z stage 60 for rough movement for bringing the probe 2 and the surface of the sample 56 close to each other. The Z stage 60 for rough movement has a structure for bringing the Z stage 60 for rough movement on which the cantilever holder 59 is mounted close to the sample 56 by using a mechanism including the stepping motor 61 and the feed screw 62 with a supporting point that is a leg of the micrometer head 63.

In the apparatus having the structure described above, when the probe 2 and the sample 56 are brought close to each other in an area where an atomic force acts, a flexure occurs in the cantilever 4 due to the atomic force that acts on the tip of the probe 2. In this case, a distortion occurs in the piezoresistance members 5a and 5b made of the p-type silicon so that the resistance value is changed. This change of the resistance value is amplified by the preamplifier 64 and is detected so that the flexure amount is measured. The preamplifier 64 and the piezoresistance members 5a and 5b constitute a bridge circuit so as to apply a bias signal to the piezoresistance members 5a and 5b, and a signal output in accordance with the change of the resistance value is amplified and detected. The detection signal from the preamplifier 64 is supplied to a differential amplifier (not shown) and is compared with a reference signal so that the flexure amount is measured. The flexure amount depends on a distance between the probe 2 and the sample 56. Therefore, if the servo operation of the micromotion mechanism 58 is performed by a servo mechanism (not shown) in such a manner that the flexure amount becomes constant, the distance between the sample and the probe may be maintained to be constant.

The evanescent light 57 generated on the surface of the sample 56 usually exists within a distance of approximately 100 nm from the surface of the sample 56 and is attenuated exponentially along with being apart from the surface of the sample 56. When the probe 2 and the sample 56 are moved in the servo operation to be positioned in this area, the evanescent light 57 is scattered by the tip of the probe 2 so that Raman scattering light and Rayleigh scattering light are generated. Further, the Raman scattering light scattered by the tip of the probe 2 is amplified by the electric field amplifying action of the silver layer 52 to be converted into propagating light.

The scattering light is condensed by the lens 55 that is identical with the lens used for receiving the exciting light. When the condensing action is performed, the entire objective lens 55 including a part with a numerical aperture of 1 or smaller acts for condensing the light. The condensed optical signal passes through the half mirror 58 and is bent by 90 degrees by the total reflection mirror 65. After the Rayleigh scattering light is removed by the notch filter 66 and the image is formed by the imaging lens 67, the light is led to the spectroscope 68 for the spectral analysis. In addition, a light intensity detector 69 is connected to the spectroscope 68 for measuring intensity of a specific wavelength selected by the spectroscope 68. In this embodiment, an avalanche photodiode is used as the light intensity detector 69.

In the near-field Raman microscope 53 having the structure described above, by using the triaxial micromotion mechanism 58, the sample 56 is scanned in the two-dimensional plane while the height between the sample 56 and the probe 2 is kept to be constant, the shape image is measured, and a part to be analyzed is specified from the shape image. With the triaxial micromotion mechanism 58, the tip of the probe 2 is adjusted to the position to be measured, the measured position is adjusted to the spot 57 generated by the evanescent light, and the spectral analysis is performed. Therefore, the local Raman spectral analysis may be performed with a resolution beyond a diffraction limit. In addition, the spectroscope 68 selects a specific wavelength, and the triaxial micromotion mechanism 58 scans while the light intensity is measured. As a result, mapping of the optical information may be also measured with a high resolution beyond the diffraction limit on the sample surface.

In the conventional near-field Raman microscope, if the exciting light with high intensity is projected, a component of the exciting light or the scattering light is projected to the displacement detecting portion of the self displacement sensing cantilever, and optical noise occurs and the distance control between the probe and the sample becomes impossible. In this embodiment, however, the metal film 52 having the silver surface shields the light, and hence the measurement with the near-field Raman microscope may be performed without the influence of the optical noise. Therefore, it is possible to perform the near-field Raman spectral analysis while the sample is irradiated with the exciting light having high intensity. In addition, when the displacement detection of the cantilever is performed in the conventional optical leverage system, the optical leverage wavelength becomes noise if the wavelength detected by the spectral analysis is approximate to the optical leverage wavelength. In this embodiment, however, such noise is also prevented by using the self displacement sensing cantilever 50.

In addition, by using silver for the metal film 52, both the amplifying effect of the Raman scattering light and the light shielding effect may be obtained at the same time.

When combined with the inverted microscope as in this embodiment, the rear side of the cantilever 4 is hardly irradiated with light. Therefore, the metal light shield film 52 should be provided only to the side on which the probe 2 is disposed.

Note that the near-field spectral analysis may be performed also in the upright microscope 21 according to the first embodiment by using the laser beam of the laser microscope 40 and the spectroscope 41. In this case, even a sample that does not transmit light may be measured, and an optical leverage system that is disposed on the rear side of the conventional cantilever may be eliminated. Therefore, the objective lens for exciting and condensing light may be made closer to the probe tip. For this reason, the objective lens having a short working distance and a large numerical aperture may be used to improve the exciting efficiency and the condensing efficiency.

The surface metal 52 may be any metal other than silver. Further, this embodiment may be applied to fluorescent analysis, infrared spectral analysis, or the like other than the Raman spectral by changing the light source, the detector, and the optical system.

Third Embodiment

Figure 6A:
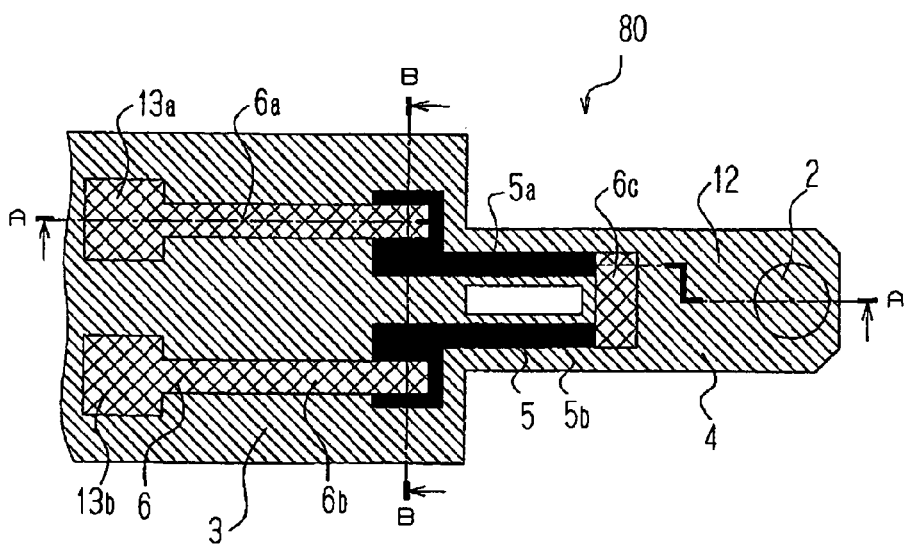
FIG. 6A is a plan view of a self displacement sensing cantilever according to a third embodiment of the present invention.
Figure 6B:
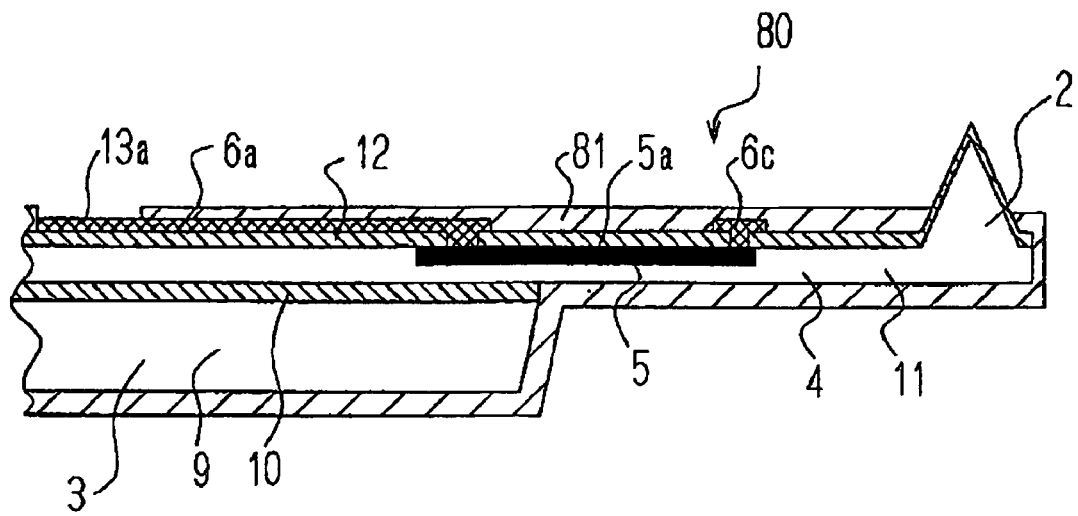
FIG. 6B is a cross sectional view cut along the line A-A of FIG. 6A.
Figure 6C:
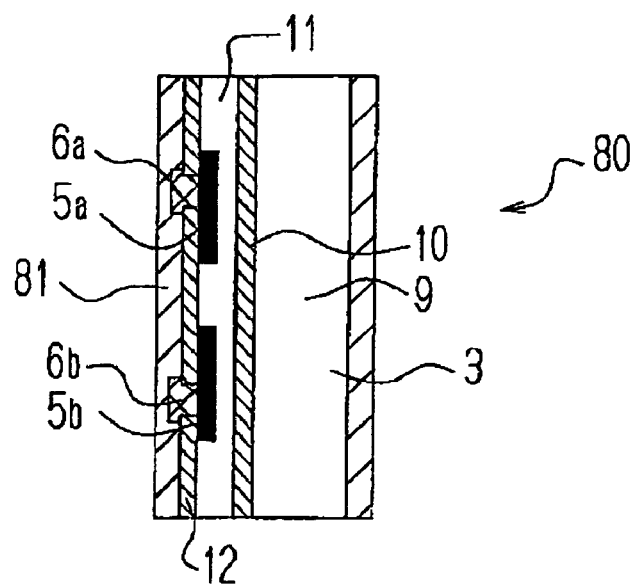
FIG. 6C is a cross sectional view cut along the line B-B of FIG. 6A.

FIGS. 6A to 6C illustrate a self displacement sensing cantilever 80 according to a third embodiment of the present invention. FIG. 6A is a plan view of a surface on which the probe 2 is disposed, which illustrates the state before forming an insulation film 81 that is described later. In addition, FIGS. 6B and 6C illustrate cross sections respectively cut along the line A-A and the line B-B of FIG. 6A, and illustrate the state where the insulation film 81 is formed.

This embodiment is different from the first embodiment illustrated in FIG. 1 in that the insulation film 81 itself formed on the electrodes 6a, 6b, and 6c, the n-type silicon substrate 11, the p-type silicon portions 5a and 5b, and the silicon oxide film 12 has a light shield property with respect to the illumination light of the optical microscope, and that no metal coating is formed on the insulation film 81. Further, in this embodiment, the physical property measurement is not performed and only the shape image observation is the purpose. Therefore, the insulation film is not coated on the probe portion 2 so as to prevent the tip of the probe 2 from being thick to lower the resolution in the shape image measurement. Other structures are the same as the first embodiment, and hence the same structural element is denoted by the same reference symbol, and detailed description thereof is omitted.

The insulation film 81 of this embodiment is coated with colored polymer coating. Because the insulation film 81 itself has a light shield property, the measurement may be performed while illumination light of the optical microscope is projected without forming a light shield film such as a metal film on the insulation film 81.

Fourth Embodiment

Figure 7A:
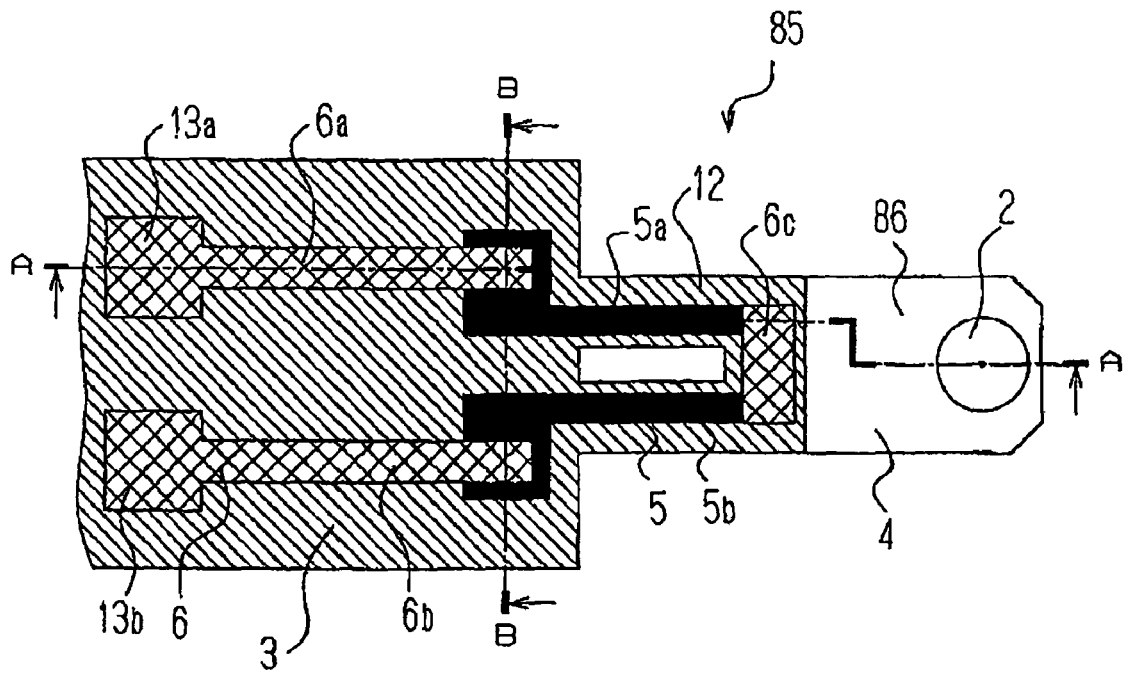
FIG. 7A is a plan view of a self displacement sensing cantilever according to a fourth embodiment, of the present invention.
Figure 7B:
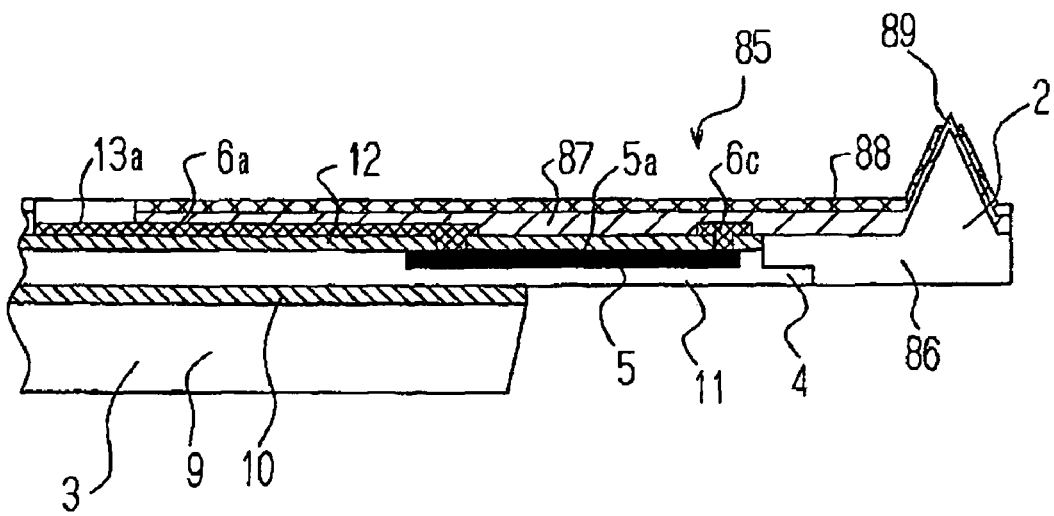
FIG. 7B is a cross sectional view cut along the line A-A of FIG. 7A.
Figure 7C:
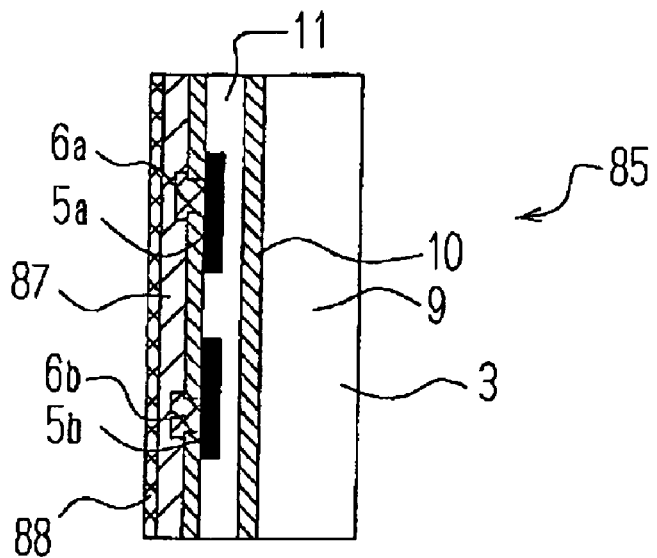
FIG. 7C is a cross sectional view cut along the line B-B of FIG. 7A.

FIGS. 7A to 7C illustrate a self displacement sensing cantilever 85 according to a fourth embodiment of the present invention. FIG. 7A is a plan view of the side on which the probe 2 is disposed, in the state before an insulation film 87 and a metal film 88 are formed, which are described later. In addition, FIGS. 7B and 7C illustrate cross sections respectively cut along the line A-A and the line B-B of FIG. 7A, in the state where the insulation film 87 and the metal film 88 are formed. Also in this embodiment, a part having the same function as the part in the second embodiment illustrated in FIGS. 4A to 4C is denoted by the same reference symbol, and detailed description thereof is omitted.

In this embodiment, the displacement detecting portion 5 of the proximal end portion of the cantilever 4 has the same structure as FIGS. 4A to 4C, and the tip portion 86 of the cantilever 4 has a structure in which silicon oxide transparent with respect to visible light constitutes the cantilever and the proximal end portion and the tip portion are bonded to each other. The insulation film 87 made of silicon nitride is formed on the surface of the self displacement sensing cantilever 85 having such structure on the probe 2 side, and is coated with an aluminum layer 88. Further, the aluminum layer is removed partially at the probe tip portion so that an opening 89 having a diameter of approximately 50 nm is formed on the tip. With this structure of the self displacement sensing cantilever 85, light having a wavelength of approximately 300 to 1,200 nm may permeate the silicon oxide film 86 and the silicon nitride film 87 constituting the probe, and the evanescent field may be formed in the vicinity of the opening 89 of the probe tip. When such self displacement sensing cantilever 85 is used in the scanning near-field microscope, it is possible to irradiate the sample with the near field from the opening 89 or to condense the near field generated in the sample by the opening 89, and as a result, a local optical characteristic analysis may be performed.

Fifth Embodiment

Figure 8:
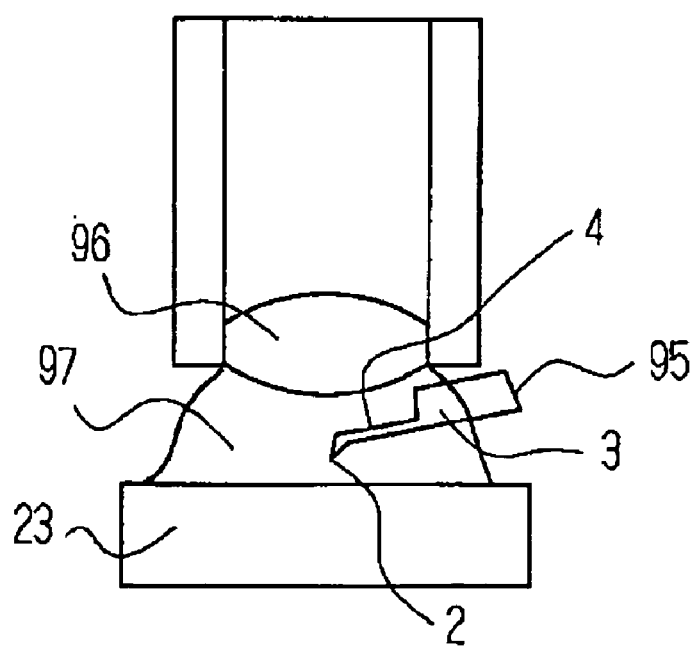
FIG. 8 is a general appearance view of a scanning probe microscope according to a fifth embodiment of the present invention.
Figure 9A:
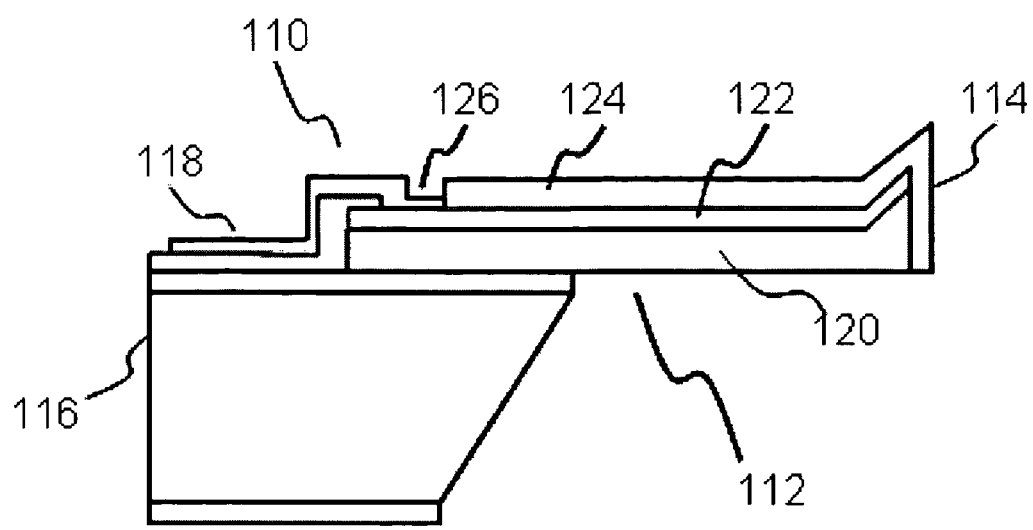
FIGS. 9A to 9C illustrate a general appearance view of a conventional self displacement sensing cantilever.
Figure 9B:
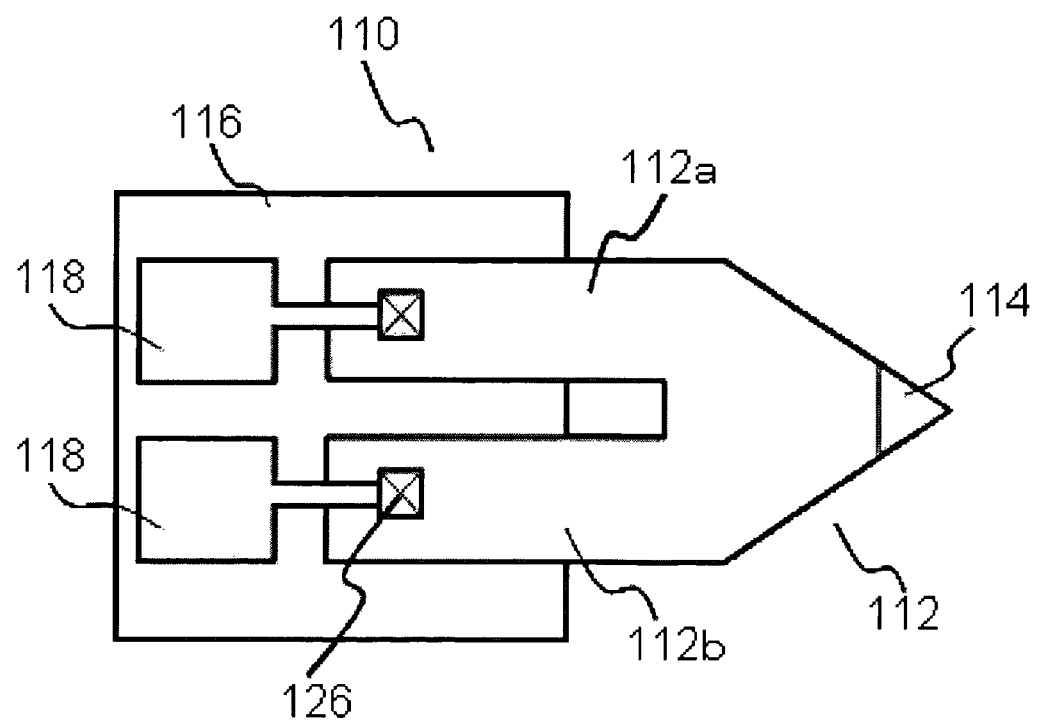
Figure 9C:
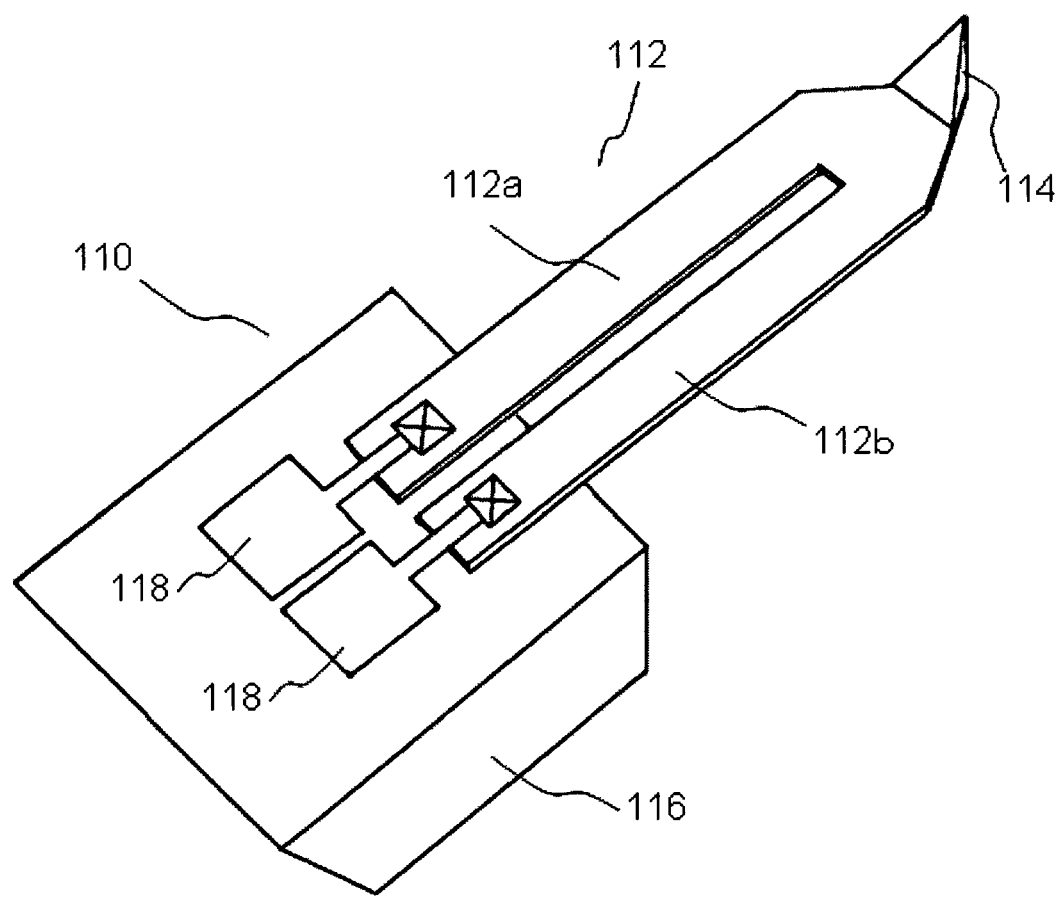

FIG. 8 illustrates a general appearance view of a scanning probe microscope using the immersion lens according to a fifth embodiment of the present invention. Note that FIG. 8 illustrates only a structure of a main part concerning this embodiment, and detailed structures of the optical microscope and the scanning probe microscope are omitted.

In this embodiment, an immersion objective lens 96 is attached to the upright optical microscope, and water 97 is filled between the sample 23 and the tip of the immersion objective lens 96. The self displacement sensing cantilever 95 is disposed in the solution 97 between the immersion objective lens 96 and the sample 23. In addition, the probe 2, the cantilever 4, and a part of the proximal end portion 3 are immersed in the solution 97. When the self displacement sensing cantilever 95 is viewed from the rear side, the probe 2 protrudes from the tip of the cantilever portion 4, and hence the tip of the probe 2 may be measured by the optical microscope. In addition, a silicon nitride film is formed as the insulation film, and the insulation film is coated with gold that has superior corrosion resistance and chemical resistance. Other structures of the self displacement sensing cantilever 95 are the same as the embodiment illustrated in FIG. 1.

With this structure of the scanning probe microscope, the measurement may be performed with the objective lens having a high numerical aperture, and hence the resolution is improved in the observation with the optical microscope. Further, in the spectral analysis or in use as a scanning near-field microscope, the exciting efficiency or the condensing efficiency is improved by using the immersion lens 96, and hence the signal to noise ratio may be improved. Particularly in use as the scattering near-field microscope, an optical signal amplifying effect by the gold coating enables to condense the scattering light more efficiently.

Other Embodiments

The metal films 8, 52 or 88 formed on the topmost surface of the cantilever 1, 50 or 85 of the embodiments illustrated in FIG. 1, 4, 7 or 8 may be coated with a conductive coating of, for example, gold, platinum, rhodium or the like, and the conductive coating may be connected to an external detector, with the result that electric characteristics such as surface potential, current or capacitance of the sample surface may be measured. In this case, too, the conductive coating 8, 52 or 88 also functions as a light shield film. Further, also in the case where a change of current value of the sample is measured while exciting the sample with light externally, it is possible to prevent noise from occurring in the displacement detecting portion of the cantilever due to the exciting action of the sample.

In addition, coating with a magnetic film as the metal film 8, 52 or 88 enables magnetic characteristics of the sample surface to be measured. For instance, in order to measure characteristics of the magneto-optical material, the magnetic characteristics may be measured while light is projected to the sample.

Further other than the combination with the immersion lens of the fifth embodiment, the insulation film 7, 51 or 87 may be coated with a material having superior corrosion resistance and chemical resistance such as gold or titanium as the metal film 8, or 88, and then the measurement with the scanning probe microscope or the scattering near-field microscope may be performed in any solution like measurement of a biosample in a culture solution. In this case, the displacement detecting portion 5 and the electrode portion 6 are coated with the insulation film, and hence the measurement may be performed without occurrence of leak current or corrosion of the electrode portion 6 in the solution.

In the case of the functional coating for measuring electrical or magnetic characteristics, the case where the measurement is not accompanied with light irradiation is included in the present invention. This self displacement sensing cantilever may prevent the electrode from forming a short circuit by the functional coating, because the insulation film is formed on the electrode when the functional coating is formed.

Note that the insulation film that is formed so as to coat the displacement detecting portion may be any film such as a silicon oxide film other than the silicon nitride film. In addition, the light shield film may be any film as long as it has a light shield or extinction property with respect to the illumination light used for the measurement. If the light shield property is not necessary, any functional coating may be used in accordance with a purpose of the measurement. In addition, the material of the cantilever and the displacement detecting portion may also be any material other than n-type silicon or p-type silicon. For instance, the present invention includes a cantilever made of silicon nitride with a piezoelectric thin film formed on the cantilever so as to constitute the displacement detecting portion.

In addition, the insulation film and the functional coating on the insulation film are not necessarily formed on the entire surface of the cantilever.

As described above, if the self displacement sensing cantilever of the present invention is used for measurement with the scanning probe microscope, it is possible to perform the measurement with the scanning probe microscope at the same time as projecting light. Therefore, the resolution of the optical microscope that is combined with the scanning probe microscope may be improved, the exciting efficiency or the condensing efficiency in the optical characteristic measurement may be improved, and accuracy of positioning or operability may also be improved. In addition, even when the displacement detecting portion and the electrode portion communicated with the displacement detecting portion are provided to the cantilever, the functional coating may be formed easily without losing the function of the displacement detecting portion, and hence physical properties such as optical, electric or magnetic properties may be easily measured with high accuracy.

What is claimed is:

1. A self displacement sensing cantilever, comprising:
a cantilever portion having a tip and a proximal end portion;
a probe portion formed at the tip of the cantilever portion;
a displacement detecting portion disposed on the cantilever portion for detecting a displacement of the cantilever;
an electrode portion connected to the displacement detecting portion and extending to the proximal end portion of the cantilever portion;
an insulation film formed over at least one of the electrode portion and the displacement detecting portion; and
a coating of an arbitrary material having a preselected property formed on the insulating film for imparting the preselected property to the cantilever portion.

2. A self displacement sensing cantilever according to claim 1; wherein the coating on the insulation film comprises a metal film.

3. A self displacement sensing cantilever according to claim 1; wherein the insulation film comprises one of a silicon nitride film and a silicon oxide film.

4. A self displacement sensing cantilever according to claim 1; wherein the coating on the insulation film is applied continuously to the probe portion.

5. A self displacement sensing cantilever according to claim 4; wherein the coating on the insulation film comprises a conductive film having conductivity as the preselected property.

6. A self displacement sensing cantilever according to claim 1; wherein the coating on the insulation film comprises a magnetic film having a magnetic property as the preselected property.

7. A self displacement sensing cantilever according to claim 1; wherein the coating on the insulation film comprises a film having a light intensity amplifying effect as the preselected property.

8. A self displacement sensing cantilever according to claim 1; wherein at least one of the insulation film and the coating on the insulation film functions as a light shield film.

9. A combined optical microscope/scanning probe microscope apparatus, comprising:
an optical microscope having an illumination device; and
a self displacement sensing cantilever according to claim 8 disposed above an optical path of the optical microscope for performing measurement of a sample while the illumination device of the optical microscope projects illumination light onto the sample.

10. A scanning probe microscope, comprising:
a self displacement sensing cantilever according to claim 8 for performing a measurement operation; and
a light source for projecting light to at least one of a sample and the probe portion of the self displacement sensing cantilever during a measurement operation.

11. A scanning probe microscope according to claim 10, wherein the light source forms an evanescent field in a vicinity of a tip of the probe portion of the self displacement sensing cantilever.

12. A scanning probe microscope according to claim 11; wherein the tip of the probe portion scatters the evanescent field to measure optical characteristics of a surface of the sample.

13. A scanning probe microscope according to claim 11; wherein the tip of the probe portion of the self displacement sensing cantilever has an opening part formed therein, the probe portion being coated with the light shield film except for an opening part of the probe portion, and optical characteristics of the sample surface are measured by one of generating the evanescent field in a vicinity of the opening part to be projected to a sample surface and condensing the evanescent light by the opening part.

14. A scanning probe microscope having the self displacement sensing cantilever according to claim 1.

15. A scanning probe microscope according to claim 14; wherein at least a part of the self displacement sensing cantilever is immersed in a solution for performing the measurement operation.

16. A scanning probe microscope according to claim 15; further comprising an immersion lens; and wherein at least a part of the self displacement sensing cantilever is immersed in a solution filled between the immersion lens and the sample for performing the measurement operation.

17. A cantilever comprising:
a probe portion;
a cantilever portion having a free end portion from which the probe portion extends;
a displacement detecting portion that detects a displacement of the cantilever portion according to an interaction between a sample and the probe portion;
an electrode portion connected to the displacement detecting portion;
an insulation film formed over at least one of the electrode portion and the displacement detecting portion; and
a functional coating disposed on the insulation film and comprised of one of a conductive film, a magnetic film and a film having a light intensity amplifying effect.

18. A cantilever according to claim 17; wherein the insulation film is made of one of silicon nitride and silicon oxide.

19. A cantilever according to claim 18; wherein the functional coating comprises a metal film.

20. A cantilever according to claim 17; wherein at least one of the functional coating and the insulation film comprises a light shielding film.

\* \* \* \* \*